United States Patent
Shiota

(10) Patent No.: US 7,003,696 B1
(45) Date of Patent: Feb. 21, 2006

(54) FAULT MANAGEMENT SYSTEM FOR SWITCHING EQUIPMENT

(75) Inventor: Yoshiaki Shiota, Tokyo (JP)

(73) Assignee: NEC Corporation, Tokyo (JP)

( * ) Notice: Subject to any disclaimer, the term of this patent is extended or adjusted under 35 U.S.C. 154(b) by 267 days.

(21) Appl. No.: 09/588,190

(22) Filed: Jun. 7, 2000

(30) Foreign Application Priority Data

Jun. 8, 1999 (JP) ................... 11-161416

(51) Int. Cl.
*G06F 11/00* (2006.01)

(52) U.S. Cl. .............. 714/23; 714/4; 714/34; 370/244

(58) Field of Classification Search ............ 714/4, 714/23, 34; 370/244
See application file for complete search history.

(56) References Cited

U.S. PATENT DOCUMENTS

| | | | | |
|---|---|---|---|---|
| 5,450,486 | A | | 9/1995 | Maas et al. ............. 379/399 |
| 5,936,944 | A | * | 8/1999 | Shiraishi et al. ......... 370/244 |
| 6,141,326 | A | * | 10/2000 | Minami .................. 370/244 |
| 6,202,090 | B1 | * | 3/2001 | Simone .................. 709/220 |
| 6,453,430 | B1 | * | 9/2002 | Singh et al. ............. 714/47 |

FOREIGN PATENT DOCUMENTS

| | | | |
|---|---|---|---|
| JP | 61-277246 | | 12/1986 |
| JP | 01311792 A | * | 12/1989 |
| JP | 02226432 A | * | 9/1990 |
| JP | 6-075876 | | 3/1994 |
| JP | 6-350695 | | 12/1994 |
| JP | 8-256178 | | 10/1996 |
| JP | 9-289524 | | 11/1997 |
| JP | 10-285163 | | 10/1998 |

* cited by examiner

*Primary Examiner*—Robert Beausoliel
*Assistant Examiner*—Emerson Puente
(74) *Attorney, Agent, or Firm*—Foley & Lardner LLP

(57) ABSTRACT

A fault management system for a switching equipment is disclosed by which, when an recoverable fault occurs with a processor or a circuit section of a switching equipment, a malfunction of an associated terminal equipment or the like or a fault of a physical layer in an associated apparatus can be detected without depending upon a manual operation of an operator. When a clock fault detection section detects that supply of a clock signal of a quartz oscillator which supplies the clock signal to a processor is interrupted, it notifies a concentrated fault management section of the result of the detection as an unrecoverable fault. The concentrated fault management section receives the notification and continuously signals reset signals for resetting the processor and a circuit section to the processor and the circuit section, respectively. Further, the concentrated fault management section sends a fault notification to a central control section connected to an external console.

1 Claim, 2 Drawing Sheets

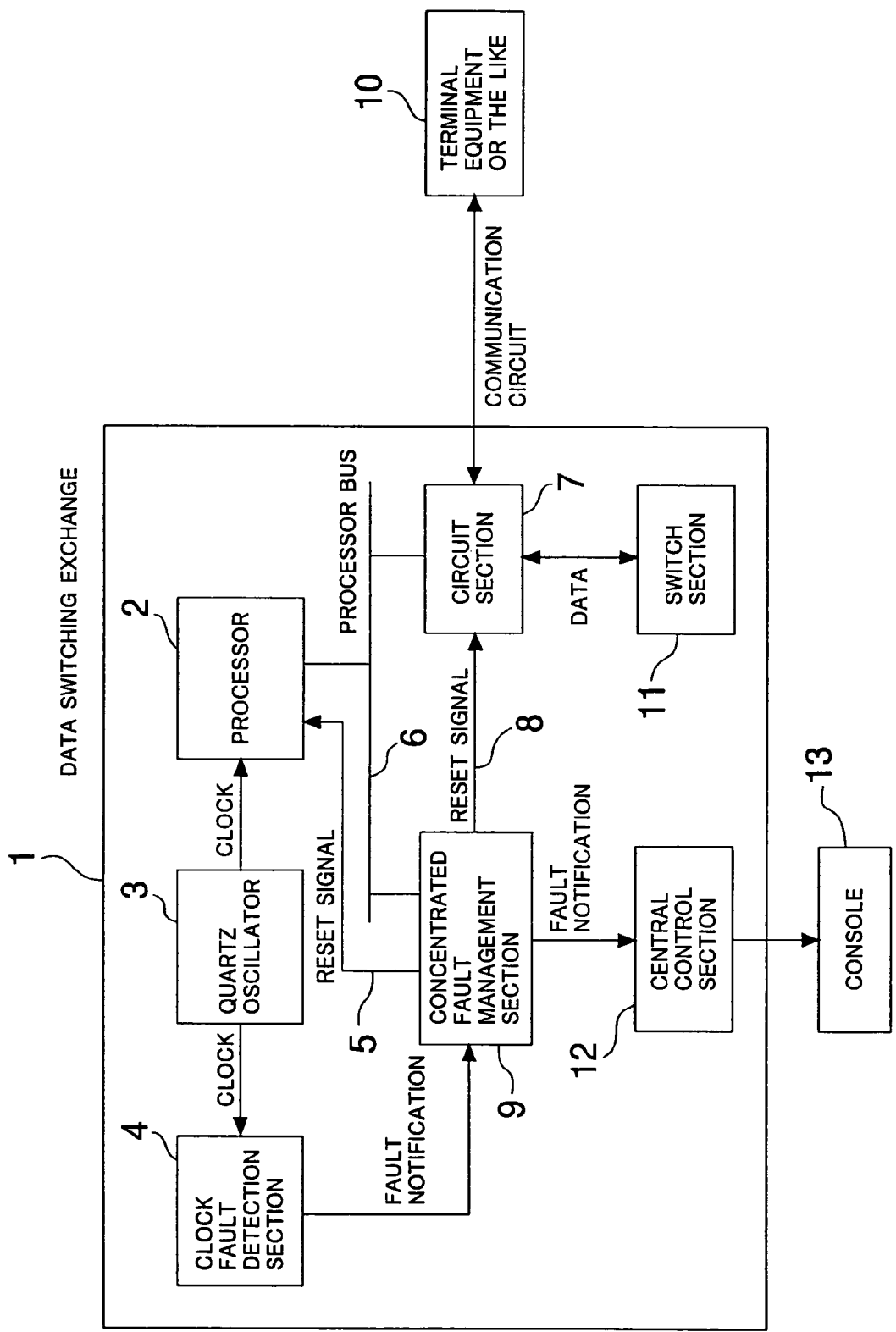

FAULT MANAGEMENT SYSTEM FOR SWITCHING EQUIPMENT

BACKGROUND OF THE INVENTION

1. Field of the Invention

The present invention relates to fault management of a circuit section of a switching equipment such as an exchange or a router which includes a processor such as a frame relay, and more particularly to a management system for an recoverable and critical fault.

2. Description of the Related Art

A switching equipment such as an exchange or a router includes a processor which performs central control, a switch section, and a circuit processing section (refer to, for example, Japanese Patent Laid-Open No. Hei 08-256178 or No. Hei 06-350695). The circuit processing section sometimes includes a local processor for performing protocol processing or routing processing for input/output packets or load distribution (refer to, for example, Japanese Patent Laid-Open No. Hei 09-289524). Generally, a communication protocol is formed in a hierarchical model including a physical layer which is the lowermost layer, a data link layer and other higher layers, and the layers are definitely separate from each other. The processor takes charge of processing of packets and data in the data link layer or higher layers.

Conventionally, if an unrecoverable and critical fault about the processor occurs with the circuit processing section of an equipment of the type described above, then it is necessary for an operator to manually input a compulsory reset instruction to the circuit processing section from a console to compulsorily cut a circuit in order to prevent a disabled condition of data transmission/reception or a condition wherein disconnection of a circuit for preventing such a disabled condition of data transmission/reception is impossible as disclosed in Japanese Patent Laid-Open No. Hei 06-075876.

FIG. 1 shows a fault circuit compulsory resetting system disclosed in Japanese Patent Laid-Open No. Hei 06-075876. Referring to FIG. 1, if an operator command for changing a state of a communication circuit 104 is inputted from a console 105 by an operator, then a command analysis section 116 of a host computer 101 analyzes the operator command. If the operator command is a communication circuit connection command, then the command analysis section 116 sends a connection request to a circuit state changing section 115. However, if the analyzed operator command is a communication circuit disconnection command, then the command analysis section 116 sends a disconnection request to the circuit state changing section 115. On the other hand, if the analyzed operator command is a command for compulsorily resetting a communication circuit, then the command analysis section 116 sends a compulsory reset request to a compulsory circuit disconnection section 117.

If the circuit state changing section 115 receives a circuit connection request from the command analysis section 116, then it performs connection of the circuit through a circuit control section 113 and sets a circuit state of a circuit state management table 111 to "connected". On the other hand, if the circuit state changing section 115 receives a disconnection request of a circuit from the command analysis section 116, then it performs disconnection of the circuit through the circuit control section 113 and sets the circuit state of the circuit state management table 111 to "disconnected". Further, if the circuit state changing section 115 receives a fault notification of a circuit from the circuit control section 113, then it sends a fault notification of the circuit to a data transfer section 114 and sets the circuit state of the circuit state management table 111 to "fault".

If the data transfer section 114 receives a data transmission/reception request from an on-line information processing program section 112, then it searches the circuit state management table 111 for a pertaining communication circuit using a circuit identification name as a key and discriminates whether or not the circuit state of the communication circuit is "connected". If the circuit state is "connected", then the data transfer section 114 performs communication of data with a terminal equipment 102 and an external host computer 103 through the circuit control section 113. However, if the circuit state is not "connected", then the data transfer section 114 sends a transmission/reception failure notification.

On the other hand, if the data transfer section 114 receives a fault notification from the circuit state changing section 115 or the compulsory circuit disconnection section 117, it stops the data communication and notifies the on-line information processing program section 112 that transmission/reception of data is abnormal.

If the compulsory circuit disconnection section 117 receives a compulsory resetting request of a circuit from the command analysis section 116, then it sends a fault notification to the data transfer section 114 and sets the circuit state of the circuit state management table 111 to "fault".

However, the fault management system described above is disadvantageous in that, since it is necessary for its operator to enter a compulsory reset command by a manual inputting operation into the console, considerable time is required until a fault is removed after the fault occurs. Consequently, it is a matter of course that communication processing cannot be performed before the fault is recovered. Besides, if the fault occurs about the processor which performs data transmission/reception processing, then there is the possibility that the circuit section may malfunction and signal illegal data, which should not originally be transmitted, to a terminal equipment or the like (associated apparatus) on the opposing side to the circuit section, resulting in a malfunction of the associated apparatus. Even if the circuit section does not malfunction, it likely occurs that the processor stops and processing on the data link layer or on a higher layer stops while the physical layer operates normally, and it is difficult for the associated apparatus to discriminate the fault.

SUMMARY OF THE INVENTION

It is an object of the present invention to provide a fault management system for a switching equipment by which, when an recoverable fault occurs with a processor or a circuit section of the switching equipment, a malfunction of an associated terminal equipment or the like or a fault of a physical layer in an associated apparatus can be detected without depending upon a manual operation of an operator.

In order to attain the object described above, according to the present invention, there is provided a fault management system for a switching equipment which includes a circuit section and a processor for performing setting and control of the circuit section and transmits and receives data to and from a terminal equipment or the like, comprising a fault detection section for detecting a fault which occurs in the switching equipment, and a concentrated fault management section operable when the fault detection section detects an unrecoverable fault for continuously signaling a reset signal for resetting the processor and the circuit section to the processor and the circuit section.

In the fault management system for a switching equipment, also the circuit section is reset, and consequently, a circuit is disconnected. Consequently, the switching equipment does not signal illegal data to a terminal equipment associated with the circuit section or a switch in the switching equipment, and besides, detection of a fault of the physical layer can be performed definitely by the associated apparatus.

Preferably, the fault detection section detects whether or not supply of a clock signal of an oscillator which supplies the clock signal to the processor is interrupted, and notifies, when the supply of the clock signal is interrupted, the concentrated fault management section of the result of the detection as an unrecoverable fault.

The concentrated fault management section may be connected to and supervise a processor bus which interconnects the processor and the circuit section and continuously signal, when a fault occurs with the processor bus, a reset signal to the processor and the circuit section.

The concentrated fault management section may send a notification of occurrence of a fault to a central control section connected to an external console.

The fault management system for a switching equipment is advantageous in that, when a critical fault occurs about the processor, it is not necessary for an operator to perform disconnection of a circuit by manually inputting a reset command or the like. The reason is that the concentrated fault processing section automatically signals a reset signal to disconnect the circuit.

The fault management system for a switching equipment is advantageous also in that the possibility that, when an unrecoverable fault occurs around the processor which performs setting and control of the circuit section, illegal data which should not naturally be transmitted at all from the circuit section to a terminal equipment or the like associated with the circuit section may be signaled to and cause a malfunction of the associated apparatus is eliminated. Further, where the processor performs processing such as working for all of packets and data which pass the circuit section, even if a fault occurs such that only data in the data link layer or an upper layer does not flow while no fault occurs with the physical layer of the circuit, disconnection of the circuit can be recognized by the associated terminal equipment or the like. The reason is that, when a fault occurs, the concentrated fault management apparatus automatically signals a reset signal immediately.

The above and other objects, features and advantages of the present invention will become apparent from the following description and the appended claims, taken in conjunction with the accompanying drawings in which like parts or elements are denoted by like reference symbols.

BRIEF DESCRIPTION OF THE DRAWINGS

FIG. 2 is a block diagram showing a construction of a fault management system to which the present invention is applied.

DESCRIPTION OF THE PREFERRED EMBODIMENT

Figure 1:
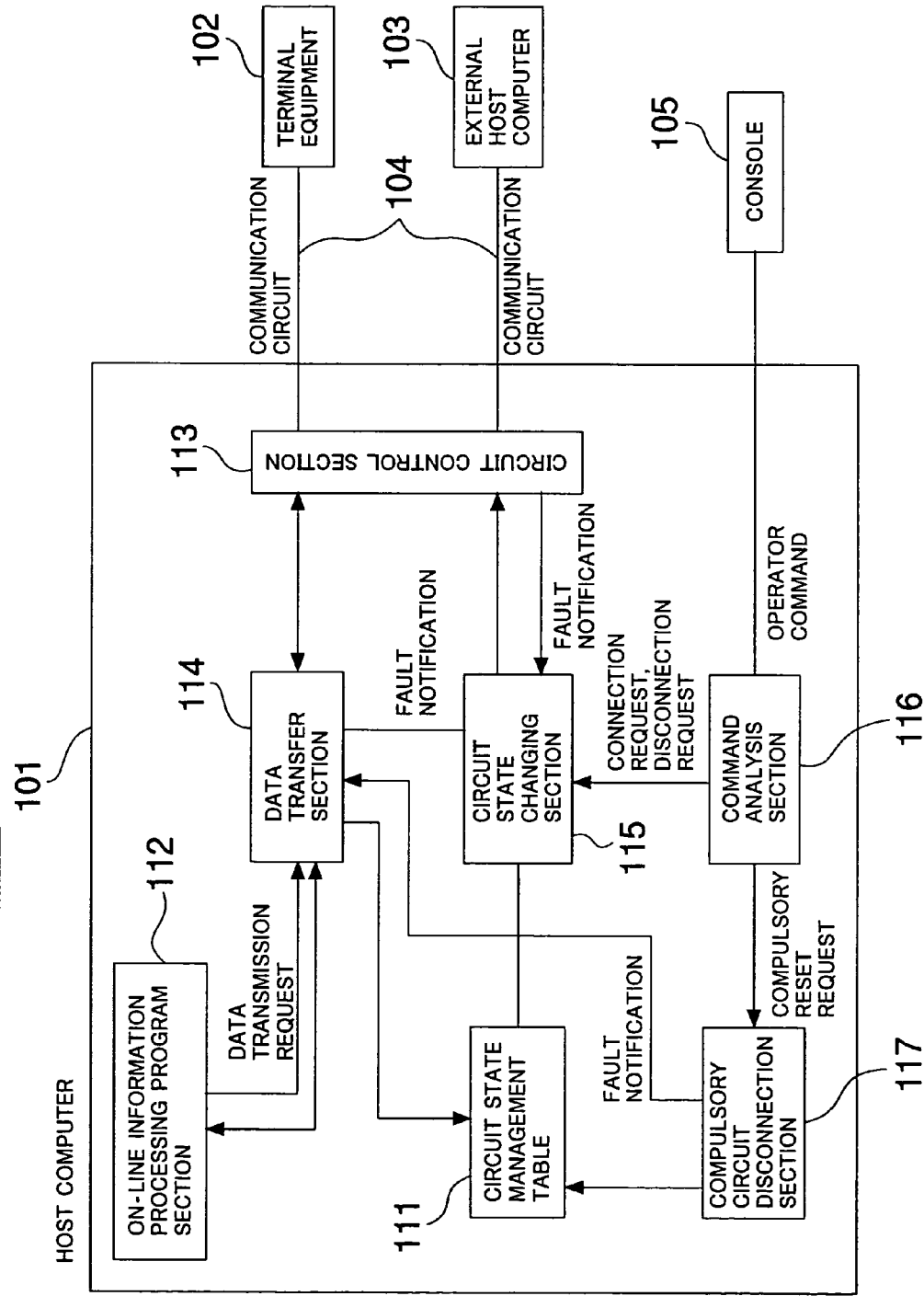
FIG. 1 is a block diagram showing a construction of a conventional fault management system.

Referring to FIG. 2, there is shown a fault management system to which the present invention is applied.

A data switching exchange 1 includes a processor 2, a quartz oscillator 3 for supplying a clock signal to the processor 2, a clock fault detection section 4 for detecting whether or not supply of the clock signal is interrupted, a circuit section 7 connected to an external terminal equipment 10 or the like over a communication circuit, a concentrated fault management section 9 for continuously signaling a reset signal 5 and a reset signal 8 to the processor 2 and the circuit section 7, respectively, when an unrecoverable fault occurs, a switch section 11 for communicating data with the circuit section 7, and a central control section 12.

When the data switching exchange 1 operates normally, the processor 2 receives and operates with the clock signal from the quartz oscillator 3 and performs setting and control of the circuit section 7, protocol processing of a transmission/reception packet and so forth over a processor bus 6.

The circuit section 7 receives data from the terminal equipment 10 or the like and transfers the data to the switch section 11 under the setting and control from the processor bus 6. Further, the circuit section 7 receives data from the switch section 11 and transfers the data to the terminal equipment 10 or the like. A packet or data for transmission/reception is data in a layer higher than the physical layer.

The clock fault detection section 4 is formed from a monostable multivibrator and receives the clock signal from the quartz oscillator 3 to supervise the normality of the clock signal. If the clock signal is interrupted, then the clock fault detection section 4 sends a fault notification to the concentrated fault management section 9.

The concentrated fault management section 9 is connected to the processor bus 6 to supervise the normality of the processor bus 6 and receives a fault notification from the clock fault detection section 4. If a fault occurs, then the concentrated fault management section 9 continuously transmits the reset signal 5 and the reset signal 8 to the processor 2 and the circuit section 7, respectively, and sends a fault notification to the central control section 12.

The central control section 12 is connected to an external console 13 and sends a notification to the console 13 when a fault occurs. The operator can recognize occurrence of the fault through the console 13.

While a preferred embodiment of the present invention has been described using specific terms, such description is for illustrative purposes only, and it is to be understood that changes and variations may be made without departing from the spirit or scope of the following claims.

What is claimed is:

1. A fault management system for a switching equipment which includes a circuit section connected to an external terminal equipment over a communication circuit, a switch section for communicating data with said circuit section, and a processor for performing setting and control of said circuit section, protocol processing of a transmission/reception packet and other processing over a processor bus, comprising:
a clock fault detection section for supervising the normality of an oscillator for supplying a clock signal to said processor and detecting whether or not supply of the clock signal from said oscillator is interrupted, and
a concentrated fault management section connected to said clock fault detection section and said processor bus for supervising the normality of said processor bus and for continuously signaling, if a fault notification of the interruption of the supply of the clock signal is received from said clock fault detection section, a reset signal to said processor and said circuit section utilizing signal lines separate and distinct from said processor bus so that data in a data link layer or an upper layer may not flow from said processor or said circuit section and issuing a notification of occurrence of a fault to a central control section connected to an external console.

* * * * *